(12) United States Patent
Knee

(10) Patent No.: US 8,619,064 B2
(45) Date of Patent: Dec. 31, 2013

(54) DYNAMIC RESISTANCE CONTROL OF A STYLUS

(75) Inventor: Derek Leslie Knee, Fort Collins, CO (US)

(73) Assignee: Microsoft Corporation, Redmond, WA (US)

( * ) Notice: Subject to any disclaimer, the term of this patent is extended or adjusted under 35 U.S.C. 154(b) by 440 days.

(21) Appl. No.: 12/769,327

(22) Filed: Apr. 28, 2010

(65) Prior Publication Data

US 2011/0267318 A1 Nov. 3, 2011

(51) Int. Cl.
*G06F 3/033* (2013.01)
(52) U.S. Cl.
USPC ........................................ 345/179; 178/19.04
(58) Field of Classification Search
USPC ......... 345/179–183; 178/18.01–18.09, 18.11, 178/19.01–19.07
See application file for complete search history.

(56) References Cited

U.S. PATENT DOCUMENTS

| 5,627,348 A * | 5/1997 | Berkson et al. ............ 178/19.04 |
| 6,050,718 A | 4/2000 | Schena et al. |
| 6,201,533 B1 | 3/2001 | Rosenberg et al. |
| 6,405,158 B1 | 6/2002 | Massie et al. |
| 7,265,750 B2 | 9/2007 | Rosenberg |
| 7,307,619 B2 | 12/2007 | Cunningham et al. |
| 7,339,572 B2 | 3/2008 | Schena |
| 7,404,716 B2 | 7/2008 | Gregorio et al. |
| 7,423,631 B2 | 9/2008 | Shahoian et al. |
| 7,508,382 B2 | 3/2009 | Denoue et al. |
| 2005/0248549 A1 | 11/2005 | Dietz et al. |

FOREIGN PATENT DOCUMENTS

| JP | 05197487 A | * 8/1993 |
| JP | 2004234072 A | 8/2004 |
| KR | 102009003059 A | * 3/2009 |
| KR | 1020090030594 A | 3/2009 |

OTHER PUBLICATIONS

Oakley, et al., "Putting the Feel in 'Look and Feel'", Retrieved at <<http://eprints.gla.ac.uk/3204/1/putting_the_feel.pdf>>, Conference on Human Factors in Computing Systems, Proceedings of the SIGCHI conference on Human factors in computing systems, Apr. 1-6, 2000, pp. 9.

"International Search Report", Mailed Date: Nov. 28, 2011, Application No. PCT/US2011/033833, Filed Date: Apr. 25, 2011, pp. 9, (MS# 329462.02).

* cited by examiner

*Primary Examiner* — Kevin M Nguyen
(74) *Attorney, Agent, or Firm* — Wolfe-SBMC

(57) ABSTRACT

Dynamic resistance control of a stylus is described. In implementations, a stylus includes a housing configured to be grasped by a user. A roller ball is captured in a socket of the housing to provide rolling movement of the roller ball across a surface of a computing device and to provide one or more inputs to the computing device. A resistance adjustment module is also disposed within the housing to dynamically adjust resistance applied to the rolling movement of the roller ball.

20 Claims, 6 Drawing Sheets

DYNAMIC RESISTANCE CONTROL OF A STYLUS

BACKGROUND

The variety of input techniques that are available for a user to interact with a computing device is ever increasing. For example, a user may use a keyboard and mouse, a touch pad, and so on to provide inputs to the computing device. Touchscreen functionality was also developed to enable a user to interact with a display device of the computing device. For example, the touchscreen functionality may detect a finger of a user and leverage this detection as an input. Likewise, the touchscreen functionality may detect a stylus and use this detection as a basis of an input for interaction with the computing device.

Traditional techniques that were employed to provide a stylus, however, were forced to balance a feel of the stylus that was generally provided by a rough surface of the display device with possibly degrading the viewing quality of the display device by including the rough surface. Therefore, these traditional techniques may result in a compromise that is less than ideal in relation to both aspects, e.g., look of the display device and feel experienced through use of the stylus.

SUMMARY

Dynamic resistance control of a stylus is described. In implementations, a stylus includes a housing configured to be grasped by a user. A roller ball is captured in a socket of the housing to provide rolling movement of the roller ball across a surface of a computing device and to provide one or more inputs to the computing device. A resistance adjustment module is also disposed within the housing to dynamically adjust resistance applied to the rolling movement of the roller ball.

In implementations, one or more inputs are obtained at a stylus, the stylus configured to move across a surface of a computing device to also provide an input to the computing device. Resistance to the movement of the stylus across the surface is dynamically adjusted based on the one or more inputs.

In implementations, an angle of the stylus is detected in relation to a surface of a computing device, the stylus having a roller ball captured in a socket and configured to engage in rolling movement across the surface to provide one or more inputs to the computing device. Resistance to the movement of the roller ball that is in contact with the surface is dynamically adjusted based on the detected angle This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

A stylus may be used to provide inputs (e.g., as a cursor-control device) to a computing device. However, a traditional stylus was limited to approximate a single "feel" of a writing instrument due to limitations of the writing surface (e.g., a display device, writing pad, and so on) and material of the stylus. Additionally, traditional techniques that were employed to promote a particular feel may involve providing a roughened surface, which may hinder visibility of a display device. Therefore, traditional techniques often involved tradeoffs between feel of the stylus and visibility of the display device. Additionally, the material of the tip of the stylus may degrade over time and leaves marks on the display device.

Dynamic resistance control techniques are described. In implementations, resistance of a stylus to movement across of surface of a computing device may be dynamically adjusted, e.g., the resistance may be increased or decreased in succession. This resistance may be adjusted in a variety of ways, such as by distorting a socket and/or a roller ball of a roller mechanism. Additionally, the resistance may be adjusted in response to a variety of inputs, such as an angle of the stylus in relation to a surface of the computing device, a velocity of the stylus in relation to the surface of the computing device, cleanliness of the computing device, through user selection through interaction with a user interface, and so on. A variety of other examples are also contemplated, such as pen type, nib type, paper feel, paper quality, and so on, further discussion of which may be found in relation to the following sections.

In the following discussion, an example environment is first described that is operable to employ the dynamic resistance control techniques described herein. Example procedure and illustrations of a stylus and techniques involving dynamic resistance are then described, which may be employed in the example environment as well as in other environments. Accordingly, the example environment is not limited to performing the example procedures. Likewise, the example procedures are not limited to implementation in the example environment or by the example stylus.

Example Environment

Figure 1:
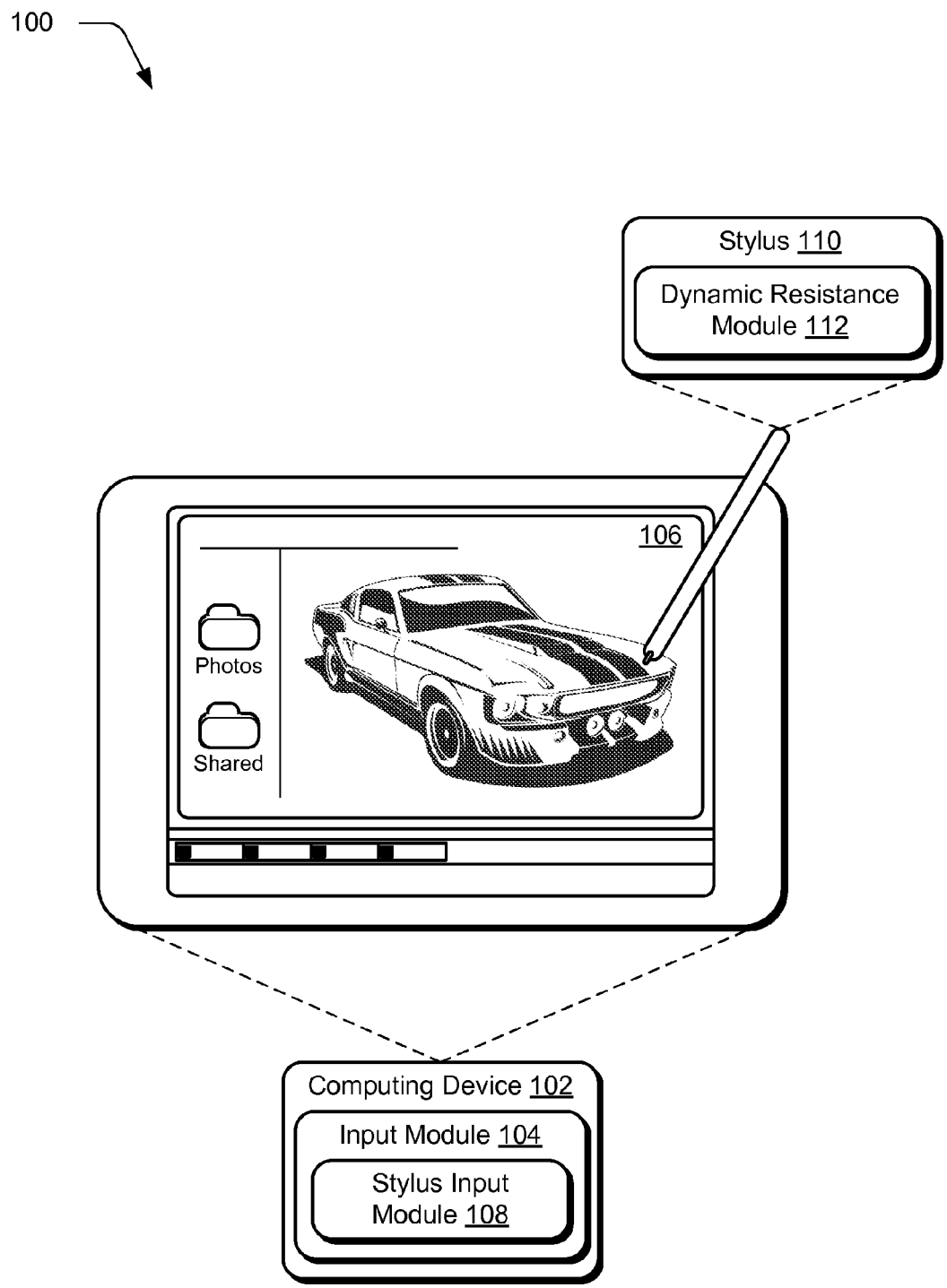
FIG. 1 is an illustration of an environment in an example implementation that is operable to employ dynamic resistance control techniques.

FIG. 1 is an illustration of an environment 100 in an example implementation that is operable to employ dynamic resistance control techniques techniques. The illustrated environment 100 includes an example of a computing device 102 that may be configured in a variety of ways. For example, the computing device 102 may be configured as a traditional computer (e.g., a desktop personal computer, laptop computer, and so on), a mobile station, an entertainment appliance, a set-top box communicatively coupled to a television, a wireless phone, a netbook, a game console, and so forth as further described in relation to FIG. 2. Thus, the computing device 102 may range from full resource devices with substantial memory and processor resources (e.g., personal computers, game consoles) to a low-resource device with limited memory and/or processing resources (e.g., traditional set-top boxes, hand-held game consoles).

The computing device 102 is illustrated as including an input module 104. The input module 104 is representative of functionality relating to inputs of the computing device 102. For example, the input module 104 may be configured to receive inputs from a keyboard, mouse, to identify gestures and cause operations to be performed that correspond to the gestures, and so on. The inputs may be identified by the input module 104 in a variety of different ways. For example, the input module 104 may be configured to recognize a touch input received via touchscreen functionality of a display device 106, such as a finger of a user's hand as proximal to the display device 106 of the computing device 102. A variety of different techniques may be employed, such as analog resistive, digital resistive, optical, acoustical, and so forth.

The input module 104 is further illustrated as include a stylus input module 108. The stylus input module 108 is representative of functionality of the computing device 102 to recognize and process inputs received from a stylus 110. For example, the stylus input module 108 may receive an input via touchscreen functionality of the computing device 102 to recognize movement of the stylus 110 across the display device 106, such as a tap, drawing of a line, and so on.

The stylus 110 includes a dynamic resistance module 112 that is representative of functionality of the stylus 110 to dynamically adjust resistance to movement of the stylus 110 across a surface of the computing device 102, such as the display device 106 as illustrated in this example. The dynamic resistance module 112, for instance, may employ a mechanism that provides a separation of how resistance is applied to movement of the stylus 110 from a physical interface between a tip of the stylus 110 and a surface, e.g., the surface of the display device 106. Thus, in this example the resistance may be dynamically adjusted without changing a surface of the display device 106, which may help to preserve desirable display characteristics of the display device 106. An example of a dynamic resistance module 112 that employs a resistance mechanism may be found in relation to the following figure.

Figure 2:
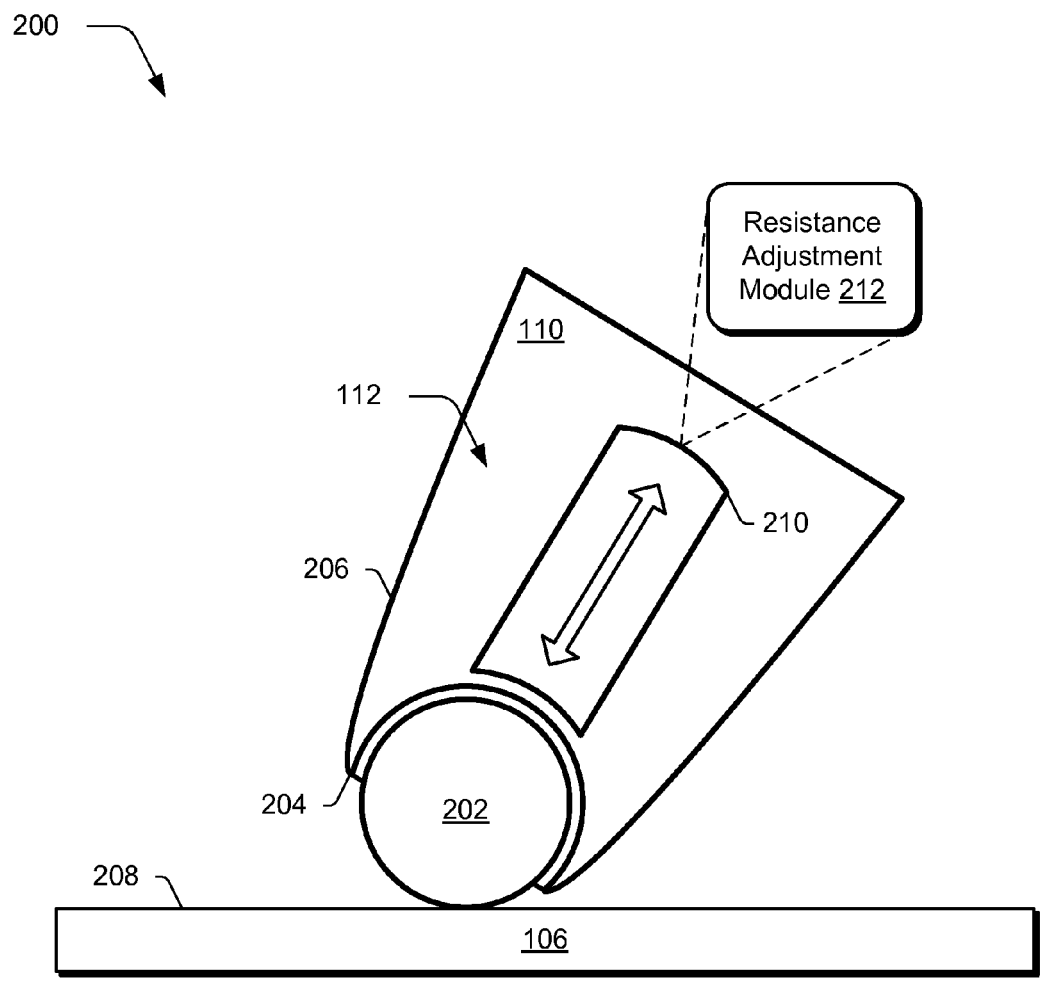
FIG. 2 is an illustration of an example system showing a stylus of FIG. 1 in a cross-sectional view and in contact with a surface, which in this instance is a display device of the computing device.

FIG. 2 illustrates an example system 200 showing the stylus 110 of FIG. 1 in a cross-sectional view and in contact with a surface, which in this instance is a surface of the display device 106 of the computing device 102. In this example, the dynamic resistance module 112 is illustrated as being implemented using a roller ball 202 that is captured within a socket 204 of a housing 206. The socket 204 may be integral to the housing 206, formed as a separate piece that is joined to the housing 206, and so on. In this way, the roller ball 202 is free to perform rolling movement across a surface 208 of the display device 106. As previously described, this movement may be detected by the computing device 102 and employed as an input, e.g., using touchscreen functionality.

The resistance mechanism in this example system 200 is illustrated as including a plunger 210. The plunger 210 is configured to distort the socket 204 and therefore increase or decrease resistance to movement of the roller ball 202 within the socket 204. For example, the plunger 210 may be configured to press again the socket 204 using varying amounts of pressure to distort the socket 204. The amounts of pressure may be controlled by a resistance adjustment module 212 disposed within the housing 206 of the stylus 110. Further, the resistance adjustment module 212 may be configured to receive inputs from "outside" of the stylus 110, such as from the computing device 102 (e.g., via an RF link), further discussion of which may be found in relation to FIGS. 4 and 5.

In this way, the resistance to movement across the surface may be dynamically adjusted (e.g., back and forth between greater and lesser relative amounts of resistance) to provide different "feels" to the use of the stylus 110. Further, the resistance may be adjusted to emulate different writing experiences, such as use of a felt-tip pen, a fountain pen, a marker, a crayon, a paint brush, and so on. In an implementation, the resistance may also be customized by a user, such as through interaction with a user interface of the computing device 102 that is output by the stylus input module 108.

Although the resistance mechanism in this example system 200 illustrates distorting the socket 204 with the plunger 210, a variety of other configurations are also contemplated. For example, a resistance mechanism may be employed that expands, contracts, and/or distorts the roller ball 202, itself. Other techniques may also be employed to adjust the resistance of the roller ball 202 to movement along the surface 208 of the display device 106, such as heat, magnetism, and so on.

Generally, any of the functions described herein can be implemented using software, firmware, hardware (e.g., fixed logic circuitry), or a combination of these implementations. The terms "module," "functionality," and "logic" as used herein generally represent software, firmware, hardware, or a combination thereof. In the case of a software implementation, the module, functionality, or logic represents program code that performs specified tasks when executed on a processing system (e.g., CPU or CPUs). The program code can be stored in one or more computer readable memory devices. The features of the dynamic resistance control techniques described below are platform-independent, meaning that the techniques may be implemented on a variety of commercial computing platforms having a variety of processors.

Example Procedures

The following discussion describes dynamic resistance control techniques that may be implemented utilizing the previously described systems and devices. Aspects of each of the procedures may be implemented in hardware, firmware, software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2.

Figure 3:
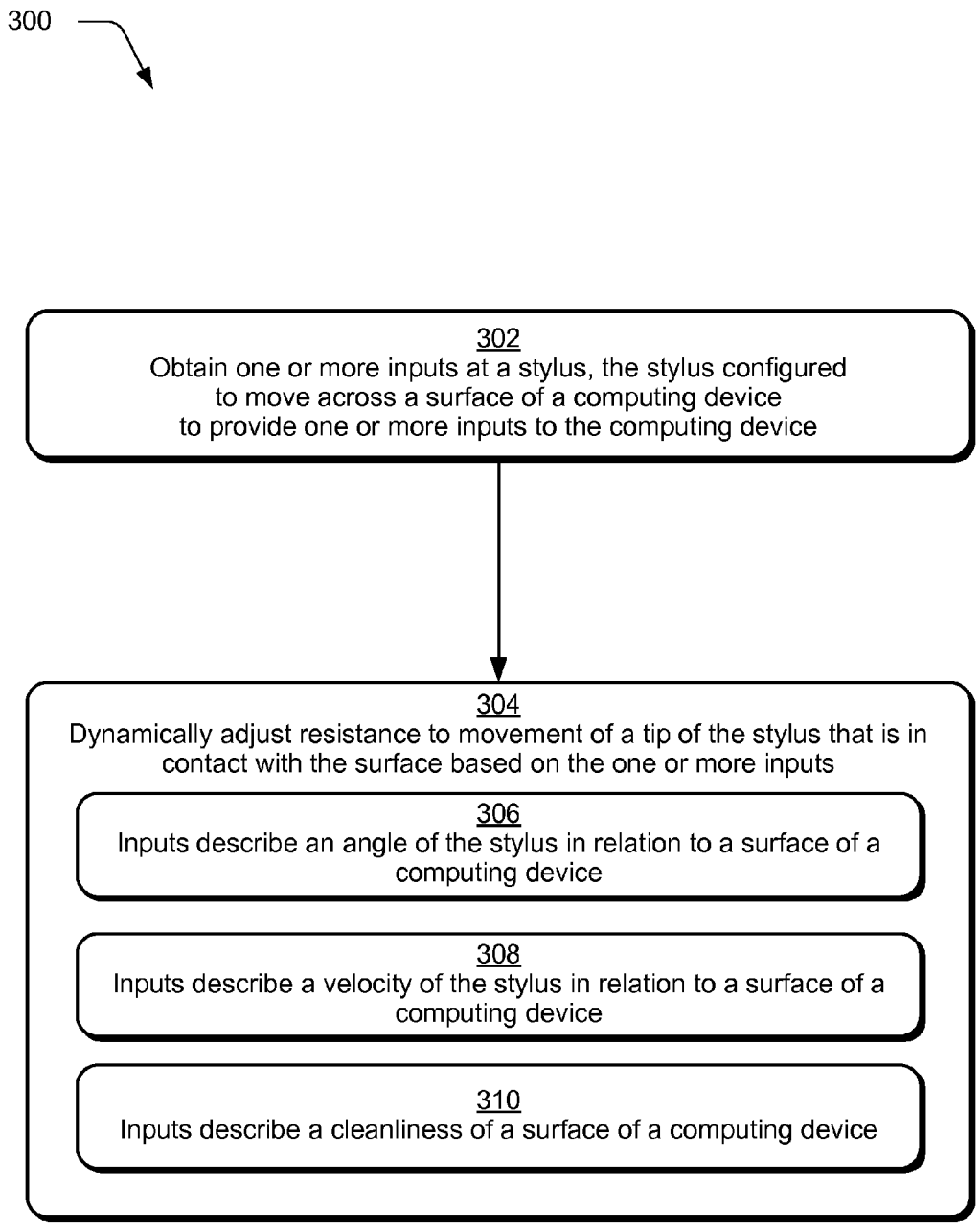
FIG. 3 depicts a procedure in an example implementation in which resistance of a tip of a stylus of FIG. 1 that is in contact with a surface is dynamically adjusted.

FIG. 3 depicts a procedure 300 in an example implementation in which resistance to movement of a tip of a stylus that is in contact with a surface is dynamically adjusted. One or more inputs are obtained at a stylus, the stylus configured to move across a surface of a computing device to provide an input to the computing device (block 302). For example, the stylus may be configured to provide an input to the computing device, such as through contacting a surface of the display device 106.

The stylus 110 may also be configured to obtain the one or more inputs that are to be used as a basis to adjust resistance. The one or more inputs may originate from a module inside the housing 206 of the stylus 110, such as through one or more positional sensors, proximity sensors, and so on. In another example, the one or more inputs may originate from a source "outside" of the housing 206 of the stylus 110, such as from the computing device 102 with which the stylus 110 is in contact and/or another device, e.g., a camera attached to a game console.

Resistance to movement of a tip of the stylus is dynamically adjusted that is in contact with the surface based on the one or more inputs (block 304). The resistance of the stylus 110 may be provided via a mechanism that provides a separation of the mechanical interface between a tip of the stylus and a writing surface from an actual friction element used to provide the varying degrees of resistance to rolling movement.

As previously described in relation to FIG. 2, for instance, the resistance may be adjusted using a variety of different techniques, such as by changing a shape and/or size of the socket 204 and/or roller ball 202. These techniques may be combined with the one or more inputs to arrive at a variety of different functionality. For example, the inputs may describe an angle of the stylus in relation to a surface of a computing device (block 306). In another example, the inputs may describe a velocity of a stylus in relation to a surface of a computing device (308). In a further example, the inputs may describe a cleanliness of a surface of a computing device (block 310). Further discussion of each of these examples and more (e.g., emulation of paper quality and feel) may be found in relation to the following figures.

Figure 4:
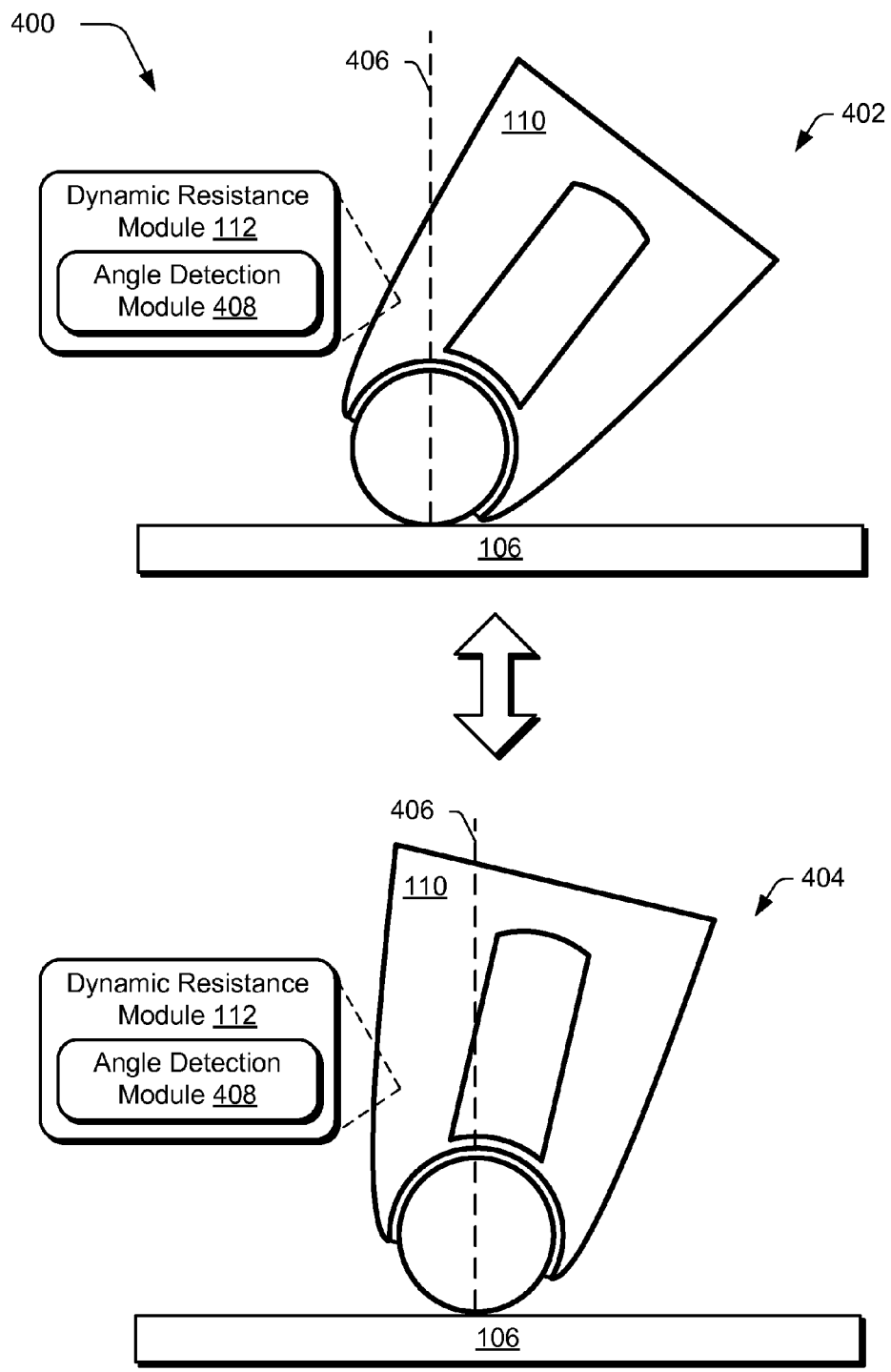
FIG. 4 depicts a system in an example implementation showing different angles of the stylus of FIG. 1 in relation to a surface of the display device of the computing device.

FIG. 4 depicts a system 400 in an example implementation showing different angles 402, 404 of the stylus 110 in relation to a surface of the display device 106. Each of the different angles 402, 404 of the stylus is illustrated through reference to an angle 406 that is perpendicular to the surface of the display device 106 and is drawn through use of a phantom line. As illustrated the first angle 402 is positioned further from perpendicular 406 than the second angle 404, which is nearly perpendicular.

In this example system 400, the dynamic resistance module 112, through the angle detection module 408, may adjust the resistance of the rolling movement based on inputs that describe the angle. For instance, the resistance to rolling may be increased as the angle from perpendicular 406 increases to reduce a likelihood of the stylus 110 from "slipping" across the surface of the display device 106. As previously described, the inputs may originate from a wide variety of different sources, such as within the stylus 110 or outside the stylus 110 such as from the computing device 102 or other device.

Figure 5:
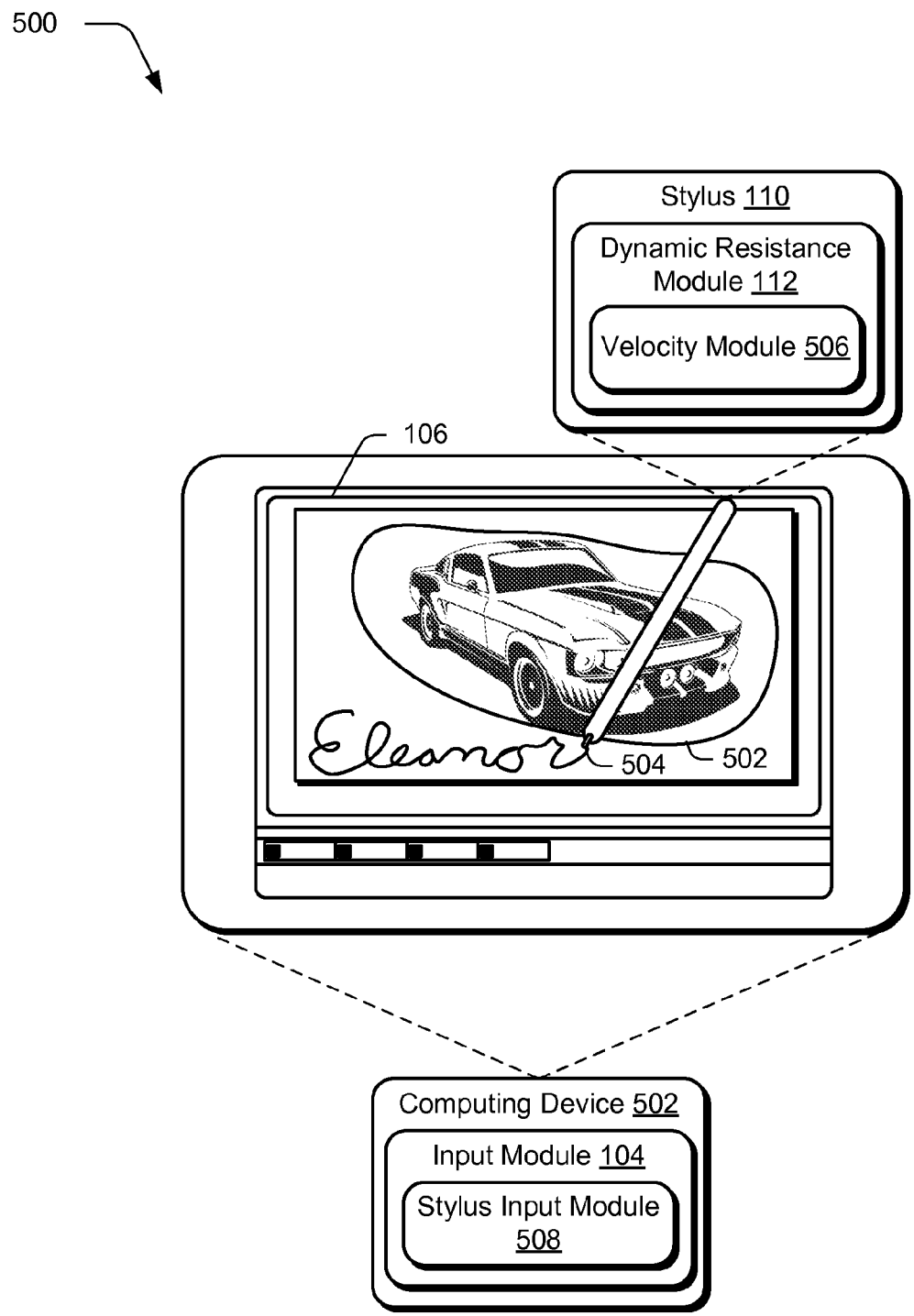
FIG. 5 depicts a system in an example implementation in which the resistance is dynamically adjustable based on velocity of the stylus of FIG. 1 across a surface of the display device of the computing device.

FIG. 5 depicts a system 500 in an example implementation in which the resistance is dynamically adjustable based on velocity of the stylus 110 across a surface of the display device 106 of the computing device 502. In this example, the stylus 110 is illustrated as having drawn a first line 502 and a second line 504. The first line 502 is illustrated as circle while the second line 504 is illustrated as cursive text "Eleanor."

In this example, the dynamic resistance module 112 employs a velocity module 506 this is representative of functionality to dynamically adjust the resistance based on a velocity of the stylus 110 across the surface of the display device 106. For example, the velocity module 506 may determine that the stylus 110 is being used to draw the first line 502 that is to be a circle and reduce resistance felt by the stylus 110. In another example, the velocity module 506 may detect that the second line 504 involves cursive text and increase resistance for the entirety or parts of the second line 504 to help a user input the text, such as to provide less resistance for straight lines and more for making curves or vice versa.

The velocity may be determined in a variety of ways, such as by the stylus 110, e.g., through detection of a speed of the roller ball or other sensors. The velocity may also be detected through a stylus input module 508 that detects inputs of the stylus, e.g., by sampling an X,Y location from a digitizer. Additionally, the stylus input module 508 may use predictive functionality to determine a likely future action, e.g., to draw straight versus curved lines, a likely length of each, and so on and adjust the resistance accordingly. A variety of other examples are also contemplated.

For instance, the velocity module 506 and/or a stylus input module 508 may make a determination as to the "cleanliness" of the surface, e.g., even at particular areas of the surface. The stylus input module 508, for instance, may notice that movement of the stylus 110 across the surface of the display device is non-uniform (e.g., "jerky") across particular portions of the surface. The stylus input module 508 may then communicate with the dynamic resistance module 112 of the stylus 110 to vary resistance accordingly, such as to increase resistance across oily areas of the surface. In another instance, the dynamic resistance module 112 itself may determine the cleanliness of the surface through monitoring movement of the stylus 110 and adjust accordingly, such as to increase and/or decrease resistance at different portions of the surface depending on the cleanliness of the surface. For example, haptic feedback may be provided so that the stylus "bumps" when crossing objects displayed on the display device.

In another instance, resistance of the stylus 110 may be dynamically adjusted as the stylus 110 nears an edge of the display device 106. For example, the resistance may be increased as the stylus 110 nears the edge, which may help keep the stylus from "hitting" an edge of the computing device 102 next to the display device 106. A variety of other instances are also contemplated, such as to manually adjust the resistance using a user interface output by the stylus 110 and/or the computing device 502.

Example Device

Figure 6:
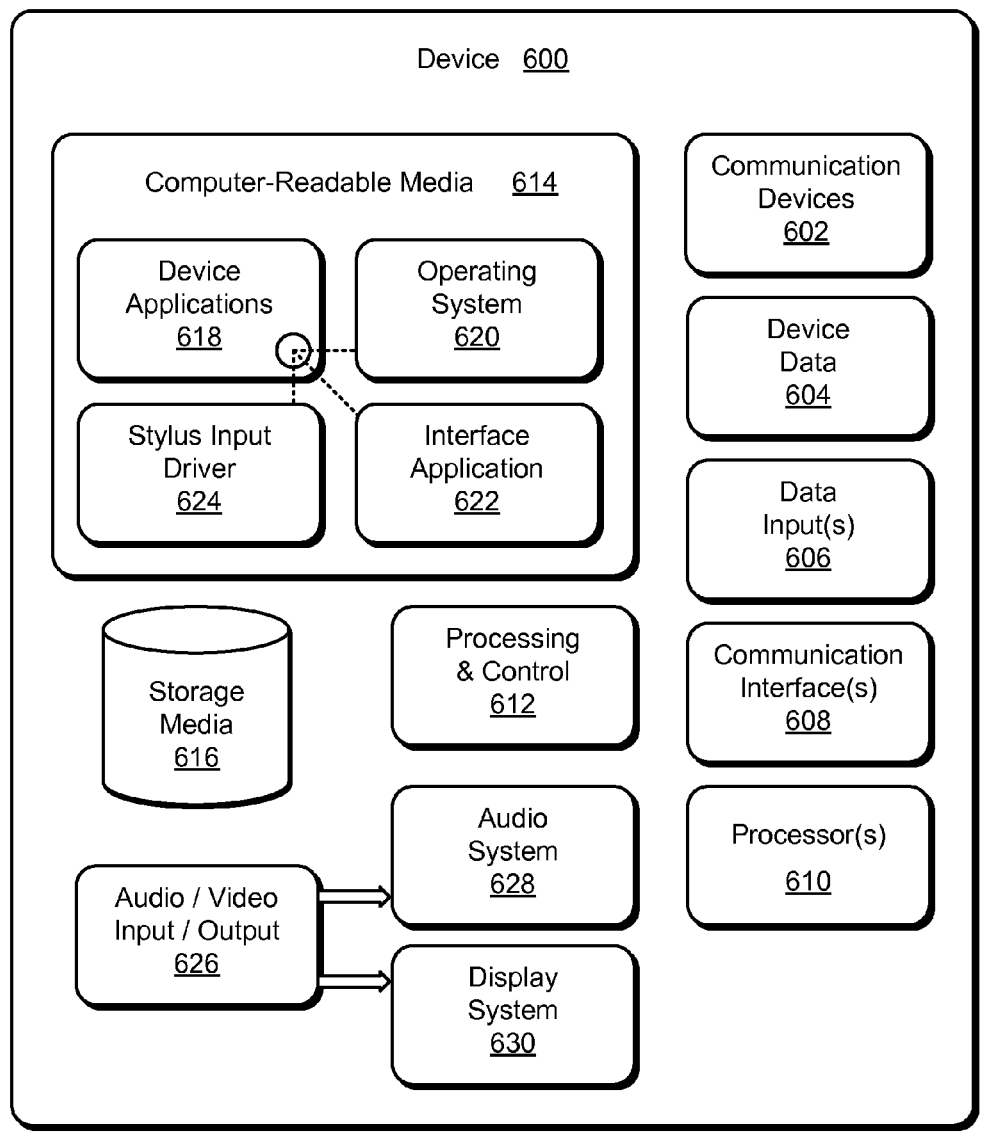
FIG. 6 illustrates various components of an example computing device in greater detail.

FIG. 6 illustrates various components of an example computing device 600 that can be implemented as any type of portable and/or computer device as described with reference to FIGS. 1 and 2 to implement embodiments of the gesture techniques described herein. Device 600 includes communication devices 602 that enable wired and/or wireless communication of device data 604 (e.g., received data, data that is being received, data scheduled for broadcast, data packets of the data, etc.). The device data 604 or other device content can include configuration settings of the device, media content stored on the device, and/or information associated with a user of the device. Media content stored on device 600 can include any type of audio, video, and/or image data. Device 600 includes one or more data inputs 606 via which any type of data, media content, and/or inputs can be received, such as user-selectable inputs, messages, music, television media content, recorded video content, and any other type of audio, video, and/or image data received from any content and/or data source.

Device 600 also includes communication interfaces 608 that can be implemented as any one or more of a serial and/or parallel interface, a wireless interface, any type of network interface (e.g., wireless to the stylus 110), a modem, and as any other type of communication interface. The communication interfaces 608 provide a connection and/or communication links between device 600 and a communication network by which other electronic, computing, and communication devices communicate data with device 600.

Device 600 includes one or more processors 610 (e.g., any of microprocessors, controllers, and the like) which process various computer-executable instructions to control the operation of device 600 and to implement embodiments of dynamic resistance control. Alternatively or in addition, device 600 can be implemented with any one or combination of hardware, firmware, or fixed logic circuitry that is implemented in connection with processing and control circuits which are generally identified at 612. Although not shown, device 600 can include a system bus or data transfer system that couples the various components within the device. A system bus can include any one or combination of different bus structures, such as a memory bus or memory controller, a peripheral bus, a universal serial bus, and/or a processor or local bus that utilizes any of a variety of bus architectures.

Device 600 also includes computer-readable media 614, such as one or more memory components, examples of which include random access memory (RAM), non-volatile memory (e.g., any one or more of a read-only memory (ROM), flash memory, EPROM, EEPROM, etc.), and a disk storage device. A disk storage device may be implemented as any type of magnetic or optical storage device, such as a hard disk drive, a recordable and/or rewriteable compact disc (CD), any type of a digital versatile disc (DVD), and the like. Device 600 can also include a mass storage media device 616.

Computer-readable media 614 provides data storage mechanisms to store the device data 604, as well as various device applications 618 and any other types of information and/or data related to operational aspects of device 600. For example, an operating system 620 can be maintained as a computer application with the computer-readable media 614 and executed on processors 610. The device applications 618 can include a device manager (e.g., a control application, software application, signal processing and control module, code that is native to a particular device, a hardware abstraction layer for a particular device, etc.). The device applications 618 also include any system components or modules to implement embodiments of the gesture techniques described herein. In this example, the device applications 618 include an interface application 622 and a stylus input driver 624 that are shown as software modules and/or computer applications. The stylus input driver 624 is representative of software that is used to provide an interface with a device configured to capture inputs from the stylus 110 (e.g., using a digitizer as previously described) and/or to communicate with the stylus 110, to provide the one or more inputs previously described, such as over an RF link. Alternatively or in addition, the interface application 622 and the stylus input driver 624 can be implemented as hardware, software, firmware, or any combination thereof. Additionally, the stylus input driver 624 may be configured to support multiple input devices, such as separate devices to capture touch and stylus inputs, respectively. For example, the device may be configured to include dual display devices, in which one of the display device is configured to capture touch and/or stylus inputs.

Device 600 also includes an audio and/or video input-output system 626 that provides audio data to an audio system 628 and/or provides video data to a display system 630. The audio and/or video input-output system 626 may also be configured to provide haptic feedback via vibration of the display device and/or the stylus as previously described. The audio system 628 and/or the display system 630 can include any devices that process, display, and/or otherwise render audio, video, and image data. Video signals and audio signals can be communicated from device 600 to an audio device and/or to a display device via an RF (radio frequency) link, S-video link, composite video link, component video link, DVI (digital video interface), analog audio connection, or other similar communication link. In an embodiment, the audio system 628 and/or the display system 630 are implemented as external components to device 600. Alternatively, the audio system 628 and/or the display system 630 are implemented as integrated components of example device 600.

CONCLUSION

Although the invention has been described in language specific to structural features and/or methodological acts, it is to be understood that the invention defined in the appended claims is not necessarily limited to the specific features or acts described. Rather, the specific features and acts are disclosed as example forms of implementing the claimed invention.

What is claimed is:

1. A stylus comprising:
   a housing configured to be grasped by a user;
   a roller ball captured in a socket of the housing to provide rolling movement of the roller ball across a surface of a computing device and to provide one or more inputs to the computing device; and
   a resistance adjustment module disposed within the housing to dynamically adjust resistance applied to the rolling movement of the roller ball as the roller ball moves across the surface based at least in part on one or more inputs communicated to the resistance adjustment module, at least one of the one or more inputs including information that describes one or more angles of the housing in relation to the surface of the computing device as the housing is moved through the one or more angles.

2. A stylus as described in claim 1, wherein the resistance adjustment module is configured to dynamically adjust the resistance through alteration of the socket.

3. A stylus as described in claim 2, wherein the alteration of the socket is configured to be performed by the resistance adjustment module through distortion of a shape of the socket.

4. A stylus as described in claim 1, wherein the resistance adjustment module is configured to dynamically adjust the resistance through alteration of the roller ball.

5. A stylus as described in claim 4, wherein the alteration of the roller ball is configured to be performed by the resistance adjustment module through distortion of a shape of the roller ball.

6. A stylus as described in claim 1, wherein the resistance adjustment module is configured to dynamically adjust the resistance using heat, magnetism, fluid resistance, electrical field resistance, or electrical field distortion.

7. A stylus as described in claim 1, wherein the roller ball is not configured to apply ink directly to the surface during the rolling movement.

8. A stylus as described in claim 1, wherein the surface is a display surface of the computing device.

9. A stylus as described in claim 1, wherein the resistance adjustment module is configured to dynamically adjust the resistance responsive to the one or more inputs including inputs that describe a velocity of the housing in relation to the surface of the computing device.

10. A stylus as described in claim 1, wherein the resistance adjustment module is configured to dynamically adjust the resistance responsive to the one or more inputs including inputs that describe cleanliness of the surface of the computing device.

11. A stylus as described in claim 1, wherein the resistance adjustment module is configured to dynamically adjust the resistance as a function of a display image on the surface of a display device.

12. A method implemented by one or more modules at least partially in hardware, the method comprising:
   obtaining one or more inputs at a stylus, the stylus configured to move across a surface of a computing device to also provide an input to the computing device; and
   dynamically adjusting resistance to the movement of the stylus across the surface based on the one or more inputs, at least one of the one or more inputs including information that originates from one or more sensors that describes one or more angles of the stylus as the stylus moves across the surface of the computing device through the one or more angles.

13. A method as described in claim 12, wherein the inputs describe cleanliness of the surface of the computing device.

14. A method as described in claim 13, wherein the dynamically adjusting is performed to decrease the resistance in response to an input describing a decrease in the cleanliness of the surface.

15. A method as described in claim 13, wherein the dynamically adjusting is performed to increase the resistance in response to an input describing a decrease in the cleanliness of the surface.

16. A method as described in claim 12, wherein the inputs describe a velocity of the stylus in relation to the surface of the computing device and the dynamically adjusting is performed to decrease the resistance in response to an increase in the velocity.

17. A method as described in claim 12, wherein the inputs describe an angle of the stylus in relation to the surface of the computing device and the dynamically adjusting is performed to decrease the resistance in response to the angle between the stylus and the surface becoming increasingly perpendicular.

18. A method implemented by one or more modules at least partially in hardware of a stylus, the method comprising:
   detecting an angle of the stylus in relation to a surface of a computing device as the stylus moves across the surface of the computing device through a plurality of angles, the stylus having a roller ball captured in a socket and configured to engage in rolling movement across the surface to provide one or more inputs to the computing device; and
   dynamically adjusting resistance to the movement of the roller ball that is in contact with the surface based on the detected angle.

19. A method as described in claim 18, wherein the dynamically adjusting is performed without a change to characteristics of a point of contact between the roller ball and the surface but is performed with a change to the characteristics between the roller ball and the socket.

20. A stylus as described in claim 1, wherein the dynamically adjusting is performed to decrease the resistance in response to the angle between the stylus and the surface becoming increasingly perpendicular.

* * * * *